3,699,097
PENICILLIN COMPOUNDS
Bernard J. Ludwig, North Brunswick, and Frank M. Berger and George M. Fukui, Princeton, N.J., assignors to Carter-Wallace, Inc., New York, N.Y.
No Drawing. Filed July 19, 1968, Ser. No. 746,004
Int. Cl. C07d 99/16
U.S. Cl. 260—239.1                                          15 Claims

ABSTRACT OF THE DISCLOSURE

Novel α-hydroxy-β-phenoxyethyl penicillins and salts thereof. The compounds possess valuable antibacterial activity and are particularly useful in cases where hypersensitivity to presently-available penicillins may occur.

---

The present invention relates to novel penicillin compounds. More particularly, the invention relates to novel penicillin compounds and their salts which are particularly useful in cases where hypersensitivity to presently-available penicillins may occur.

The value of penicillins have been somewhat limited due to the number of persons which are hypersensitive to the drug and which, upon administration thereof, develop reactions thereto ranging from mild erythema, or hives, to severe serum sickness and, in some cases, to acute anaphylaxis.

It has been estimated that approximately one out of twenty persons are hypersensitive to penicillins, to one degree or another. Consequently, a physician must use extreme caution in administering the drugs and must be prepared to administer resuscitative drugs, such as epinephrine or aminophylline, should a severe reaction develop in the patient.

It is an object of the invention to provide novel penicillin compounds and salts thereof which have valuable antibacterial action but which, at the same time, are free from undesirable side reactions. This and other objects of the present invention will become apparent to one skilled in the art in the light of the instant specification.

In its broad aspect, the invention relates to penicillin compounds which, in the acid form, have the following general formula:

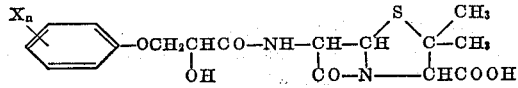

wherein $n$ is an integer having a value of 0–3 and each X is chlorine or lower alkyl. As used herein and in the appended claims, the term "lower alkyl" signifies alkyl radicals having from one to six carbon atoms.

The compounds of the present invention, which can be classified as phenoxylacetamide derivatives of 6-aminopenicillanic acid (6-APA), can be prepared by the reaction of the proper acylating agent with 6-APA.

Table 1, which follows, sets forth a representative number of the compounds of the invention. The examples which follow the table illustrate the preparation of a number of said compounds and salts thereof as well as the preparation of the lactic acids used as intermediates therein. The numbers used to designate the various compounds in the preparative examples and in the further data submitted to demonstrate the utilities thereof correspond to the numbers used in Table I to designate each compound.

TABLE I

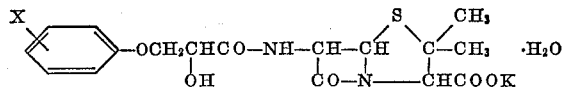

| No. | X | M.P., °C. | Formula | Calculated, percent | | | | | | Found, percent | | | | | |
|---|---|---|---|---|---|---|---|---|---|---|---|---|---|---|---|
| | | | | C | H | N | S | K | Cl | C | H | N | S | K | Cl |
| 1 | H | 218–220 | C₁₇H₂₁N₂O₇SK | 46.80 | 4.86 | 6.44 | 7.35 | 8.95 | | 46.55 | 4.72 | 6.16 | 7.07 | 8.76 | |
| 2 | 2-Cl | 211–212 | C₁₇H₂₀ClN₂O₇SK | 43.40 | 4.26 | 5.96 | 6.81 | 8.30 | 7.56 | 43.53 | 4.21 | 5.85 | 6.68 | 8.51 | 7.80 |
| 3 | 4-Cl | 222–224 | C₁₇H₂₀ClN₂O₇SK | 43.40 | 4.26 | 5.96 | 6.81 | 8.30 | 7.56 | 43.67 | 4.04 | 6.02 | 6.83 | 8.47 | 7.73 |
| 4 | 2-CH₃ | 225–226 | C₁₈H₂₃N₂O₇SK | 48.00 | 5.13 | 6.22 | 7.11 | 8.68 | | 48.66 | 5.13 | 6.17 | 6.95 | 8.93 | |
| 5 | 2-CH₃-4-Cl | 214–216 | C₁₈H₂₂ClN₂O₇SK | 44.57 | 4.36 | 5.78 | 6.61 | 8.06 | 7.31 | 44.47 | 4.23 | 5.61 | 6.40 | 7.82 | 7.52 |
| 6 | 2-Cl-4-CH₃ | 214–216 | C₁₈H₂₂ClN₂O₇SK | 44.57 | 4.36 | 5.78 | 6.61 | 8.06 | | 44.34 | 4.38 | 5.43 | 5.97 | 7.71 | |
| 7 | 2,4,6-tri-Cl | 118–145 | C₁₇H₁₈Cl₃N₂O₇SK | Compound obtained in unpurified condition | | | | | | | | | | | |

EXAMPLE 1

Preparation of potassium salt of dl-α-hydroxy-β-(4-chlorophenoxy)ethylpenicillin monohydrate (Compound 3)

50 ml. of phosgene, cooled to −60° C., is added to a stirred solution of 44.5 g. of dl-3-(4-chlorophenoxy)lactic acid in 300 ml. of tetrahydrofuran at room temperature. The solution is allowed to stand at room temperature for about 18 hours and then concentrated under reduced pressure at a temperature not exceeding 40° C. The residue is dissolved in acetone, cooled to −50° C., and a solution of 44.5 g. of 6-aminopenicillanic acid and 52 g. of sodium bicarbonate in water is added with stirring at such a rate that the temperature does not exceed −20° C. The mixture is stirred for 2 hours, allowing the temperature to rise to 20° C. It is washed with ether and the aqueous layer adjusted to pH 2 with hydrochloric acid. The acidified mixture is extracted with ether, the ether extract washed with water, and then extracted with dilute potassium bicarbonate solution, final pH 6.3. The aqueous layer is separated and evaporated to dryness at about 0° C. under reduced pressure. The crude product, weighing about 75 g., melts with decomposition at 190–195° C. It is purified by stirring in refluxing alcohol, separating by filtration and washing with additional alcohol and then with acetone. The purified potassium salt of dl-α-hydroxy-β-(4-chlorophenoxy)ethylpenicillin monohydrate melts with decomposition at 222–224° C. and has the analytical values summarized in Table I.

EXAMPLE 2

Preparation of potassium salt of dl-α-hydroxy-β-phenoxyethylpenicillin monohydrate (Compound 1)

The procedure in Example 1 is followed using 8.4 g. of dl-3-phenoxylactic acid and 20 ml. of phosgene. The product is reacted with 10 g. of 6-aminopenicillanic acid and 12 g. of sodium bicarbonate to obtain about 7 g. of crude product. This is purified by digesting with hot isopropanol. Approximately 3 g. of pure potassium salt is obtained, melting with decomposition at 218–220° C.

EXAMPLE 3

Preparation of potassium salt of dl-α-Hydroxy-β-(2-chloro-4 - methylphenoxy)ethylpenicillin monohydrate (Compound 6)

This compound is prepared from 23 g. of dl-3-(2-chloro-4-methylphenoxy)lactic acid according to the procedure described in Example 1. The reaction product, after washing with hot isopropanol, weighs about 12 g. and melts with decomposition at 214–216° C.

EXAMPLE 4

The products of the preceding examples are converted to their free-acid forms by neutralization of an aqueous or aqueous alcoholic solution of their potassium salts with hydrochloric acid to about pH 2. The acids are recovered by extraction into ether or other appropriate water immiscible organic solvent followed by removal of the solvent.

EXAMPLE 5

The free acids of Example 4 are transformed to their sodium, calcium, N,N'-dibenzylethylenediamine, and procaine salts by neutralization of a solution thereof with stoichiometric amount of the appropriate base. The salts are recovered by evaporation of the solvent under reduced pressure at freezing temperatures.

EXAMPLE A

Preparation of dl-3-(4-chlorophenoxy)latic acid

A mixture of 60 g. of dl-chlorolatic acid, 74 g. of p-chlorophenol, and 92 g. of 50% solution of sodium hydroxide in 500 ml. of water is heated on a steam bath with stirring for 2 hours. The hot mixture is acidified with 130 ml. of concentrated hydrochloric acid. After cooling, it is filtered, and the solid washed successively with water, trichloroethylene, and pentane. The crude product (70 g.) is recrystallized from a mixture of 200 ml. of methanol and 500 ml. of water with the aid of charcoal. The purified product weighs 44.5 g. and melts at 137–139° C.

*Analysis.*—Calcd. for $C_9H_9ClO_4$ (percent): C, 49.90; H, 4.19; Cl, 16.37. Found (percent): C, 49.89; H, 4.07; Cl, 16.18.

EXAMPLE B

Preparation of dl-3-phenoxylatic acid

Following the procedure described in Example A, phenol and dl-chlorolatic acid gives dl-3-phenoxylactic acid which melts at 159–161° C.

EXAMPLE C

Preparation of dl-3-(2-chloro-4-methylphenoxy)lactic acid

Following the procedure described in Example A, 2-chloro-4-methylphenol and dl-chlorolactic acid gives the desired compound. It melts at 99–103° C. after being recrystallized once from toluene and twice from water.

*Analysis.*—Calcd. for $C_{10}H_{11}ClO_4$ (percent): C, 52.07; H, 4.81; Cl, 15.36. Found (percent): C, 52.02; H, 4.88; Cl, 15.23.

The activities of the synthetic penicillins of the invention were determined by injecting 0.1 ml. of an appropriately diluted Penicillin G antisera prepared by the method of Levine et al. (J. Exp. Med., 114:888, 1961) intradermally on three separate areas on one side of a guinea pig.

The other side of the guinea pig was injected in a similar manner with 0.1 ml. of rabbit BSA (bovine serum albumen) anisera in appropriate dilutions (1/500 to 1/2000) and 0.1 ml. of physiological saline solution.

Four hours later a 1.0-ml. mixture containing 1.0 mg. BSA, 10 mg. Penicillin G (KPG) or a synthetic penicillin compound conjugated to 1 mg. of HGG (human gamma globulin) in 0.5% Evans Blue dye solution was injected intravenously to each test animal. The KPG or synthetic penicillin and HGG were incubated together at pH 11.0 for 2 hours at 23° C. prior to use to produce the KPG-HGG or synthetic penicillin-HGG conjugate as described by Levine (J. Medicinal Chem., 7:675, 1964).

The test animals received the same amounts of a mixture containing 1.0 mg. BSA, 10 mg. of the benzylpenicilloyl derivative of KPG conjugated to 1 mg. of HGG in the manner described above in 0.5% Evans Blue dye solution. The benzylpenicilloyl derivative of KPG (BPO) is alleged to be the major derivative responsible for KPG allergy.

Fifteen minutes later the reactions at the sites of intradermal injections were visually observed and scored [passive cutaneous anaphylaxis (PCA) score] as follows, based on the diffusion of the Evans Blue dye around the injection site:

0=No reaction
1+=Very light blue ring, about 2–5 mm. in diameter
2+=Light blue ring, about 5–10 mm. in diameter
3+=Light blue ring, about 10–15 mm. in diameter
4+=Dark blue ring, about 15–20 mm. in diameter In general, all animals showed no reaction at the site of the saline injection and substantial reaction at the site of BSA antisera injection.

The percent reduction of penicillin hypersensitivity for each compound was calculated according to the following formula:

$$\% \text{ Reduction of Hypersensitivity} = \frac{\text{Cumulative PCA Score of control animal minus Cumulative PCA Score given in Test Animal}}{\text{Cumulative PCA Score Given by control animal}} \times 100$$

Table II, which follows, illustrates the PCA scores at different antisera concentrations for an illustrative compound of the invention and for penicillin.

TABLE II.—COMPARATIVE PCA REACTIONS EVOKED BY BPO-HGG, COMPOUND 3-HGG, CONJUGATED IN GUINEA PIGS SENSITIZED WITH PENICILLIN G ANTISERA

| Challenge antigen | Guinea pig No. | Anti-KPG 1/50 | Anti-KPG 1/150 | Anti-KPG 1/450 | Anti-BSA 1/500 | Saline |
|---|---|---|---|---|---|---|
| BPO-HGG (10:1) plus 1 mg. BSA | 1 | 4+ | 3+ | 2+ | 4+ | 0 |
|  | 2 | 4+ | 3+ | 1+ | 4+ | 0 |
|  | 3 | 4+ | 4+ | 3+ | 4+ | 0 |
|  | 4 | 3+ | 1+ | 0 | 4+ | 0 |
|  | 5 | 4+ | 3+ | 1+ | 4+ | 0 |
|  | 6 | 4+ | 2+ | 0 | 4+ | 0 |
| PCA score |  | 23 | 16 | 7 | 24 | 0 |
| Compound 3-HGG (10:1) plus 1 mg. BSA | 7 | 1+ | 0 | 0 | 4+ | 0 |
|  | 8 | 0 | 0 | 0 | 4+ | 0 |
|  | 9 | 0 | 0 | 0 | 4+ | 0 |
|  | 10 | 0 | 0 | 0 | 4+ | 0 |
|  | 11 | 0 | 0 | 0 | 4+ | 0 |
|  | 12 | 2+ | 0 | 0 | 4+ | 0 |
| PCA score |  | 3 | 0 | 0 | 24 | 0 |

NOTE.—Percent reduction (KPG-Ab, 1/50) = 23−3/23×500 = 87%; Percent reduction (KPG-Ab, 1/150) = 16−0/16× 100 = 100%; Percent reduction (KPG-Ab, 1/450) = 7−0/7×100 = 100%; Percent reduction (BSA-Ab, 1/500) = 24−24/24×100 = 0%.

The controls were included to demonstrate that PCA reactions were not evoked by mere injection of physiological saline solution; furthermore, all guinea pigs used in the assays were capable of eliciting comparable PCA reactions when sensitized with similar quantities of BSA antisera.

Table III, which follows, sets forth the effectiveness of a representative number of the penicillins of the invention in terms of percent reduction of hypersensitivity. The percent suppression indicated is an average obtained from several tests at 1/25 sera dilution.

TABLE III

| Compound No.: | Total No. of guinea pigs tested | Average percent reduction |
|---|---|---|
| 1 | 12 | 100.0 |
| 2 | 18 | 54.6 |
| 3 | 60 | 94.7 |
| 4 | 12 | 87.5 |
| 5 | 11 | 90.0 |
| 6 | 11 | 100.0 |

The penicillin compounds of the invention were also evaluated for their antibiotic efficacy against *Diplococcus pneumoniae* and *Streptococcus mastitidis* infections in mice by both the oral and intraperitoneal route of administration.

Groups of 20 CF-1 mice, weighing approximately 20 grams each were infected with the organism intraperitoneally. Treatment of the animals by oral or intraperitoneal routes was initiated 4 hours after infection. One treatment was given on the first day of infection and two treatments given on each of the second and third days. Treatments were terminated at the end of the third day.

The cumulated number of surviving animals under various conditions of treatment is summarized in Tables IVa to IVd, which follow:

TABLE IVa.—COMPARATIVE ORAL AND IP IN VIVO ANTIBIOTIC EFFICACY OF COMPOUND 3 AND KPG AGAINST *DIPLOCOCCUS PNEUMONIAE* INFECTION IN CF-1 MICE

| Compound | Route | Dose, mg./kg. | 1 day | 2 days | 3 days |  | 6 days | Percent survival |
|---|---|---|---|---|---|---|---|---|
| Control | Untreated |  | 20/20 | 5/20 | 2/20 | Treatment terminated | 1/20 | 5 |
| Control (saline) | Oral | 0.2 ml. | 20/20 | 7/20 | 4/20 | do | 3/20 | 15 |
| KPG | do | 60 | 20/20 | 20/20 | 20/20 | do | 20/20 | 100 |
| Compound 3 | do | 60 | 20/20 | 20/20 | 20/20 | do | 20/20 | 100 |
| Control (saline) | IP | 0.2 ml. | 20/20 | 15/20 | 7/20 | do | 3/20 | 15 |
| KPG | IP | 10 | 20/20 | 20/20 | 20/20 | do | 20/20 | 100 |
|  |  | 20 | 20/20 | 20/20 | 20/20 | do | 20/20 | 100 |
| Compound 3 | IP | 10 | 20/20 | 20/20 | 20/20 | do | 20/20 | 100 |
|  |  | 20 | 20/20 | 20/20 | 20/20 | do | 20/20 | 100 |

NOTE.—Challenge dose via IP route: 300 viable cells; Treatment initiated 4 hours after infection.

TABLE IVb.—COMPARATIVE ORAL IN VIVO ANTIBIOTIC EFFICACY OF COMPOUND 3 AND KPG AGAINST *DIPLOCOCCUS PNEUMONIAE* INFECTION OF CF-1 MICE

| Treatment | Dose, mg./kg. | 1 day | 2 days | 3 days |  | 4 days | 5 days | 6 days | Percent survival |
|---|---|---|---|---|---|---|---|---|---|
| Control | Untreated | 20/20 | 10/20 | 3/20 | Treatment terminated | 3/20 | 2/20 | 1/20 | 5 |
| Do | Saline (0.2 ml.) | 20/20 | 4/20 | 2/20 | do | 1/20 | 1/20 | 1/20 | 5 |
| KGP (Penicillin G) | 50 | 20/20 | 20/20 | 19/20 | do | 19/20 | 19/20 | 19/20 | 95 |
|  | 100 | 20/20 | 20/20 | 20/20 | do | 20/20 | 20/20 | 20/20 | 100 |
| Compound 3 | 50 | 20/20 | 20/20 | 20/20 | do | 20/20 | 20/20 | 20/20 | 100 |
|  | 100 | 20/20 | 20/20 | 20/20 | do | 20/20 | 20/20 | 20/20 | 100 |

NOTE.—Challenge dose: 300 viable cells; Therapy initiated 4 hours after infection.

TABLE IVc.—COMPARATIVE ORAL IN VIVO ANTIBIOTIC EFFICACY OF COMPOUND 3 AND KPG AGAINST *STREPTOCOCCUS MASTITIDIS* INFECTION OF CF-1 MICE

| Treatment | Dose, mg./kg. | Cumulative No. survived/total tested (post challenge) at— | | | | | | | Percent survival |
|---|---|---|---|---|---|---|---|---|---|
| | | 1 day | 2 days | 3 days | | 4 days | 5 days | 6 days | |
| Control | Untreated | 3/20 | 2/20 | 1/20 | Treatment terminated | 1/20 | 1/20 | 1/12 | 5 |
| Do | Saline (0.2 ml.) | 4/20 | 2/20 | 2/20 | do | 2/20 | 2/20 | 2/20 | 10 |
| KPG (Penicillin G) | 50 | 20/20 | 20/20 | 20/20 | do | 20/20 | 20/20 | 20/20 | 100 |
| | 100 | 20/20 | 20/20 | 20/20 | do | 20/20 | 20/20 | 20/20 | 100 |
| Compound 3 | 50 | 20/20 | 20/20 | 20/20 | do | 20/20 | 20/20 | 19/02 | 95 |
| | 100 | 20/20 | 20/20 | 20/20 | do | 20/20 | 19/20 | 18/20 | 90 |

NOTE.—Challenge dose: 7×10⁵ cells; Therapy initiated 4 hours after infection.

TABLE IVd.—COMPARATIVE ORAL IN VIVO ANTIBIOTIC EFFICACY OF COMPOUND 3 AND KPG AGAINST *STREPTOCOCCUS MASTITIDIS* INFECTION OF CF-1 MICE

| Treatment | Dose/treatment, mg./kg. | Cumulative No. surviving/total tested post challenge at— | | | | | | Percent survival |
|---|---|---|---|---|---|---|---|---|
| | | 1 day | 2 days | 3 days | | 4 days | 5 days | |
| Control | Untreated | 3/20 | 2/20 | 2/20 | Treatment terminated | 1/20 | 0/20 | 0 |
| Do | Saline (0.2 ml.) | 4/20 | 2/20 | 2/20 | do | 2/20 | 2/20 | 10 |
| KPG (Penicillin G) | 50 | 20/20 | 20/20 | 20/20 | do | 20/20 | 20/20 | 100 |
| | 100 | 20/20 | 20/20 | 20/20 | do | 20/20 | 20/20 | 100 |
| Compound 3 | 50 | 20/20 | 20/20 | 19/20 | do | 19/20 | 19/20 | 95 |
| | 100 | 20/20 | 20/20 | 19/20 | do | 19/20 | 19/20 | 95 |
| (6-APA) | 50 | 6/20 | 2/20 | 1/20 | do | 1/20 | 1/20 | 5 |
| | 100 | 3/20 | 1/20 | 1/20 | do | 1/20 | 1/20 | 5 |

NOTE.—Challenge dose: 1.1×10⁶ cells; Therapy initiated 4 hours after infection.

The penicillin compounds of this invention are preferably administered orally in the form of tablets, capsules, or the like. The compounds may also be administered by injection using a suspension of the compound in water or isotonic saline solution or a solution of the compound in a solvent consisting of aqueous propylene glycol or polyethylene glycol. In addition to the active ingredient, the tablet contains conventional fillers, excipients, lubricants, etc. The active compound is generally in an amount from 25 to 90% by weight of the total composition. Typical examples of such tablets or capsules are those containing the penicillin active ingredient in an amount of from 100 to 1000 mg., preferably 500 mg.

What is claimed is:

1. A compound selected from the group consisting of the acids of the formula:

$$X_n-\text{C}_6\text{H}_{(5-n)}-\text{OCH}_2\text{CHCO}-\text{NH}-\text{CH}-\text{CH} \begin{array}{c} \text{S} \\ \\ \text{CO}-\text{N} \end{array} \begin{array}{c} \text{CH}_3 \\ \text{C}-\text{CH}_3 \\ \text{CHCOOH} \end{array}$$
$$\phantom{X_n-\text{C}_6\text{H}_{(5-n)}-\text{OCH}_2}\text{OH}$$

wherein $n$ is an integer having a value of 0–3 and each X is chlorine or lower alkyl, and the nontoxic pharmaceutically acceptable salts thereof.

2. dl-α-Hydroxy-β-phenoxyethylpenicillin monohydrate.

3. A nontoxic pharmaceutically-acceptable salt of the compound of claim 2.

4. dl - α - Hydroxy-β-(2-chlorophenoxy)ethylpenicillin monohydrate.

5. A nontoxic pharmaceutically-acceptable salt of the compound of claim 4.

6. dl-α-Hydroxy - β - (4-chlorophenoxy)ethylpenicillin monohydrate.

7. A nontoxic pharmaceutically-acceptable salt of the compound of claim 6.

8. dl - α - Hydroxy-β-(2-methylphenoxy)ethylpenicillin monohydrate.

9. A nontoxic pharmaceutically-acceptable salt of the compound of claim 8.

10. dl - α - Hydroxy-β-(2-methyl-4-chlorophenoxy) ethylpenicillin monohydrate.

11. A nontoxic pharmaceutically-acceptable salt of the compound of claim 10.

12. dl - α - Hydroxy-β-(2-chloro-4-methylphenoxy)ethylpenicillin monohydrate.

13. A nontoxic pharmaceutically-acceptable salt of the compound of claim 12.

14. dl - α - Hydroxy-β-(2,4,6-trichlorophenoxy)ethylpenicillin monohydrate.

15. A nontoxic pharmaceutically-acceptable salt of the compound of claim 14.

References Cited

UNITED STATES PATENTS

| 3,316,248 | 4/1967 | Cheney | 260—239.1 |
| 3,352,852 | 11/1967 | Cheney | 260—239.1 |
| 3,116,285 | 12/1963 | Celmer et al. | 260—239.1 |

FOREIGN PATENTS

| 737,467 | 6/1966 | Canada | 260—239.1 |
| 880,042 | 10/1961 | Great Britain | 260—239.1 |

NICHOLAS S. RIZZO, Primary Examiner

U.S. Cl. X.R.

424—271